(12) United States Patent
Tran et al.

(10) Patent No.: US 7,706,107 B2
(45) Date of Patent: Apr. 27, 2010

(54) METHOD AND APPARATUS FOR FLEXIBLE PRINTED CIRCUIT BRACKET INCLUDING CRASH STOP AND/OR AIR BLOCK IN A HARD DISK DRIVE

(75) Inventors: Gregory Tran, Santa Clara, CA (US);
Tho Pham, San Jose, CA (US);
Shiao-Hua Chen, Palo Alto, CA (US);
Joseph Chang, San Jose, CA (US)

(73) Assignee: PACECO Corp., Hayward, CA (US)

( * ) Notice: Subject to any disclaimer, the term of this patent is extended or adjusted under 35 U.S.C. 154(b) by 1043 days.

(21) Appl. No.: 11/028,354

(22) Filed: Dec. 30, 2004

(65) Prior Publication Data

US 2006/0146446 A1 Jul. 6, 2006

(51) Int. Cl.
*G11B 5/54* (2006.01)
*G11B 33/12* (2006.01)

(52) U.S. Cl. .............. 360/265.1; 360/264.2; 360/97.01; 360/97.02

(58) Field of Classification Search .............. 360/265.1, 360/97.02, 97.01, 264.2
See application file for complete search history.

(56) References Cited

U.S. PATENT DOCUMENTS

| | | | | |
|---|---|---|---|---|
| 5,329,412 A | * | 7/1994 | Stefansky | 360/97.01 |
| 5,717,544 A | * | 2/1998 | Michael | 360/256.1 |
| 6,628,482 B2 | * | 9/2003 | Hong et al. | 360/265.1 |
| 6,680,813 B2 | * | 1/2004 | Dague et al. | 360/97.01 |
| 6,865,055 B1 | * | 3/2005 | Ou-Yang et al. | 360/97.03 |
| 2006/0146448 A1 | * | 7/2006 | Tran et al. | 360/265.1 |

* cited by examiner

*Primary Examiner*—Jefferson Evans
(74) *Attorney, Agent, or Firm*—GSS Law Group (57) ABSTRACT

The present invention includes a flexible printed circuit bracket including a crash stop rubber and/or an air block. The air block directs the air flow from the rotating disk surface(s) away from the head gimbal assemblies to minimize positional variance of the read-write heads. The crash stop rubber contacts the crash stop stub on the actuator arm block, stopping actuator assembly swinging away from the disk. The invention includes making an actuator assembly with the invention's flexible printed circuit bracket, as well as making the hard disk drive. The invention includes both the actuator assembly and the hard disk drive as the products of these processes. The invention also includes the actuator assembly and the hard disk drive containing the invention's flexible printed circuit bracket.

12 Claims, 6 Drawing Sheets

Fig. 6B

METHOD AND APPARATUS FOR FLEXIBLE PRINTED CIRCUIT BRACKET INCLUDING CRASH STOP AND/OR AIR BLOCK IN A HARD DISK DRIVE

TECHNICAL FIELD

The invention relates to the operation of hard disk drives. More particularly, the invention relates to a flexible printed circuit bracket in the actuator assembly of a hard disk drive that includes a crash stop and/or an air block reducing air flow turbulence at the read-write head(s) of the actuator assembly when the disk(s) rotate.

BACKGROUND OF THE INVENTION

Prior art hard disk drives have a problem with stopping the read-write head(s) of an actuator assembly from swinging violently away from the disk spindle, possibly crashing and damaging the read-write heads. Mechanical shocks and vibrations acting upon a hard disk drive may cause such swinging. Certain hard disk drive applications, such as hand held computers, notebook computers, and MP3 players are especially susceptible to these shocks and vibrations. The prior art addresses this problem by using at least one separate part for the outside diameter crash stop, known herein as a crash stop rubber. This part, or parts, adds to the cost of producing the hard disk drive. What is needed is a cost effective mechanism providing the outside diameter crash stop while reducing the parts count.

These prior art, hard disk drives also have a problem with air turbulence affecting the read-write heads. The air turbulence often displaces the read-write heads, adversely affecting the ability of the hard disk drive to follow a track. For example, contemporary hard disk drives often have track densities around 20,000 tracks per inch, or more. As the track densities increase, the need to reduce any read-write head positional deviations also increases. Reducing the airflow at the read-write heads reduces read-write head positional variances. What is needed are new cost effective ways to reduce the air flow near the read-write heads.

SUMMARY OF THE INVENTION

The invention relates to the operation of hard disk drives. More particularly, the invention relates to a flexible printed circuit bracket in the actuator assembly of a hard disk drive that includes a crash stop and/or an air block reducing air flow turbulence at the read-write head(s) of the actuator assembly when the disk(s) rotate.

This invention includes a flexible printed circuit bracket including a crash stop rubber and/or an air block. Embodiments including the crash stop rubber, reduce the parts count in the assembled hard disk drive. Embodiments including the air block, leave the parts count unchanged while reducing the airflow upon at least one read-write head, which reduces positional variances. Embodiments including both the crash stop rubber and the air block, reduce both the parts count and the air flow at the read-write head.

The air block in the flexible printed circuit bracket directs the air flow from the rotating disk surfaces away from the head gimbal assemblies, reducing positional variances at the read-write heads. The crash stop rubber stops the actuator assembly from destructively swinging away from the disk, by contacting a crash stop stub on the actuator arm block.

The invention includes making an actuator assembly with the invention's flexible printed circuit bracket, as well as making the hard disk drive. The actuator assembly and the hard disk drive are products of these processes. The actuator assembly and the hard disk drive containing the invention's flexible printed circuit bracket.

BRIEF DESCRIPTION OF THE DRAWINGS

FIGS. 5A to 6B show comparison charts of the low frequency windage measured at each read-write head in two hard disk drives, one equipped with the invention's flexible printed circuit bracket and the other equipped with a prior art flexible printed circuit bracket.

DETAILED DESCRIPTION

This invention includes a flexible printed circuit bracket including a crash stop rubber and/or an air block. Embodiments including the crash stop rubber, reduce the parts count in the assembled hard disk drive. Embodiments including the air block, leave the parts count unchanged while reducing the airflow upon at least one read-write head, which reduces positional variances. Embodiments including both the crash stop rubber and the air block, reduce both the parts count and the air flow at the read-write head.

The air block in the flexible printed circuit bracket directs the air flow from the rotating disk surfaces away from the head gimbal assemblies, reducing positional variances at the read-write heads. The crash stop rubber stops the actuator assembly from destructively swinging away from the disk, by contacting a crash stop stub on the actuator arm block.

The invention also includes making an actuator assembly with the invention's flexible printed circuit bracket, as well as making the hard disk drive. The actuator assembly and the hard disk drive. Containing the invention's flexible printed circuit bracket are products of these processes.

Figure 1A:
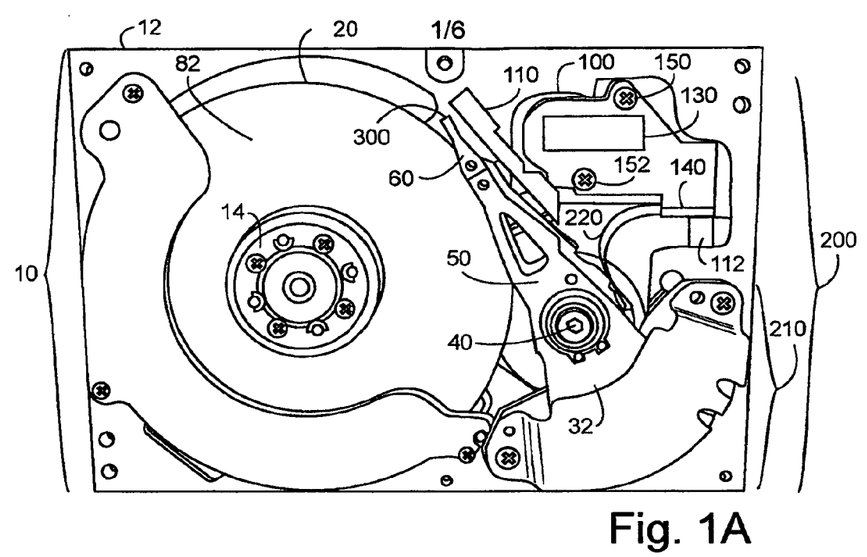
FIG. 1A shows a hard disk drive including an actuator assembly, that contains a flexible printed circuit bracket with two air blocks.

The flexible printed circuit bracket 100 is shown with just an embodiment of an air block 110 in FIG. 1A. FIG. 1A further shows the flexible printed circuit bracket including a second air block 112. As used herein, the air block 110 will refer to a thin, essentially rigid shield rising perpendicular from the flexible printed circuit bracket 100 near the actuator assembly 200, that acts to direct airflow away from at least one head gimbal assembly 60 of the hard disk drive 10.

The air block 110 in the flexible printed circuit bracket 100 directs the air flow from the rotating disk surface 82 away from the head gimbal assembly 60, reducing positional variances at the read-write head 300. The disk 20 rotating about the disk spindle 14 creates the rotating disk surface 82. While a hard disk drive 10 may readily include more than one disk, more than one rotating disk surface, more than one read-write head, and more than one actuator arm, the basic effect of the present invention on the hard disk drive remain similar.

An experiment with a hard disk drive 10 including the air block 110 similar to that shown in FIG. 1A, confirmed that the air block reduced the airflow upon at least one read-write head, and reduced positional variances. Comparison charts are shown in FIGS. 5A to 6B, of the low frequency windage measured at each read-write head 300 in two hard disk drives, one equipped with the flexible printed circuit bracket 100 of FIG. 1A. Both hard disk drives include a disk 20 and a second disk 22. Each disk has two rotating disk surfaces accessed by separate read-write heads on separate head gimbal assemblies. The vertical axes are labeled "windage", which is measured in pico-meters (p). The horizontal axes are labeled "frequency" and are measured in Herz (Hz).

Figure 5A:
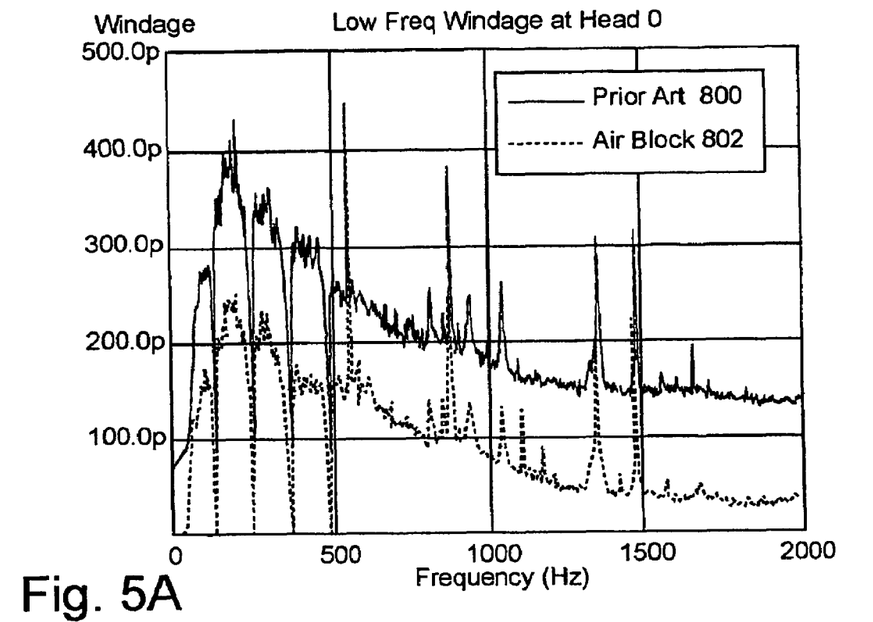
Figure 5B:
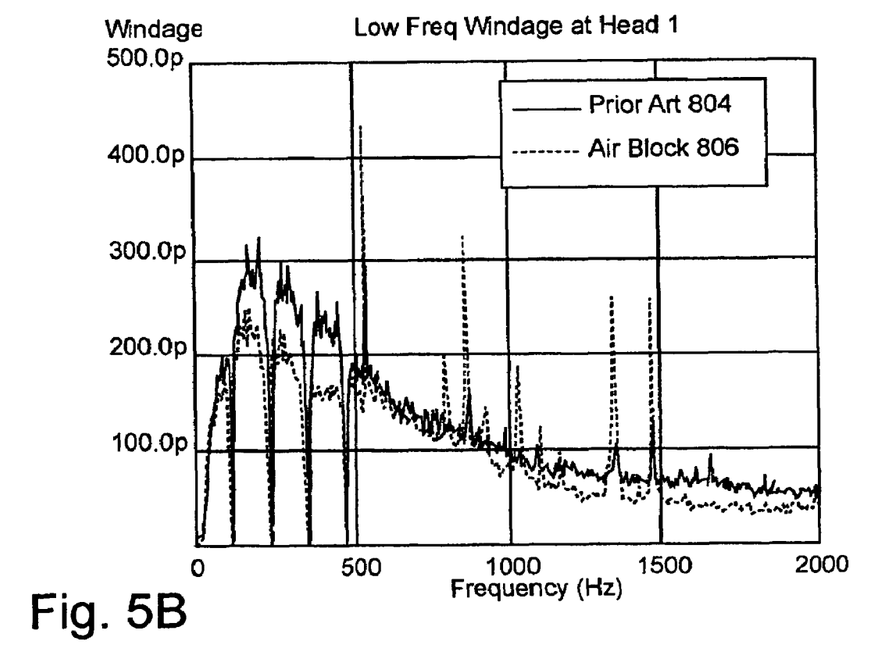
Figure 6A:
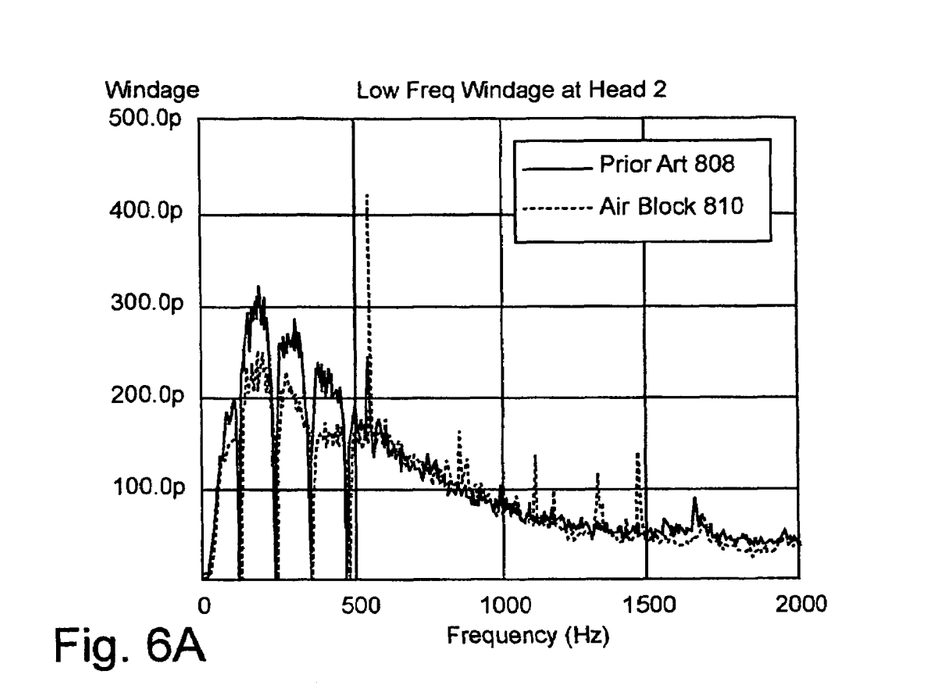
Figure 6B:
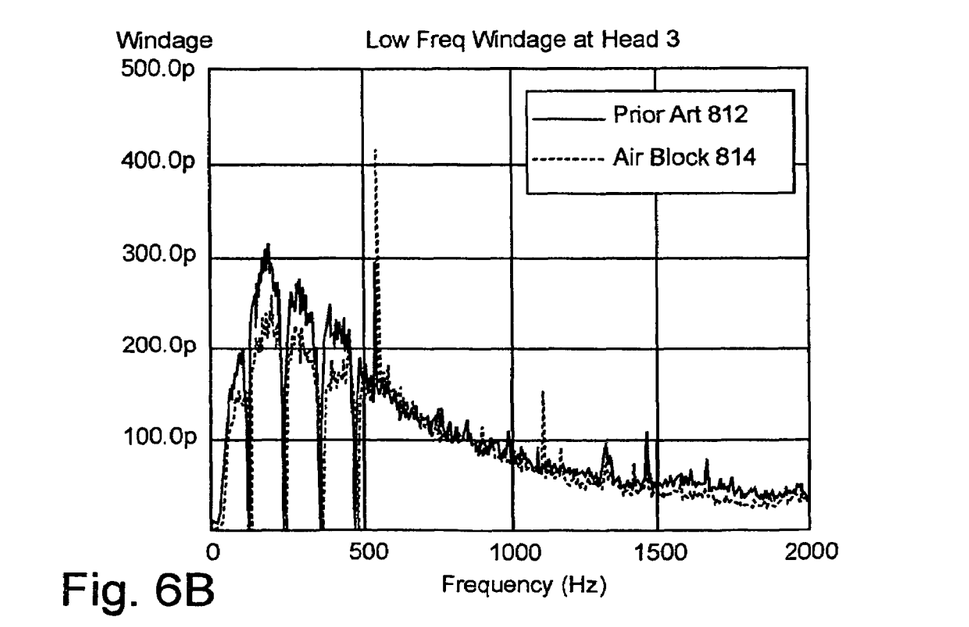

In summary, the experimental results of FIGS. 5A to 5B indicate that the total positional variance across the displayed spectrum was 3.24 nano-meters (nm) for the prior art equipped hard disk drive. The total positional variance for the hard disk drive implementing the invention was 2.69 nm. FIG. 5A shows the results for a read-write head 0, with the prior art results being trace 800 and the invention's results being trace 802. FIG. 5B shows the results for a read-write head 1, with the prior art results being trace 804 and the invention's results being trace 806. FIG. 5C shows the results for a read-write head 2, with the prior art results being trace 808 and the invention's results being trace 810. FIG. 5D shows the results for a read-write head 3, with the prior art results being trace 812 and the invention's results being trace 814.

Figure 1B:
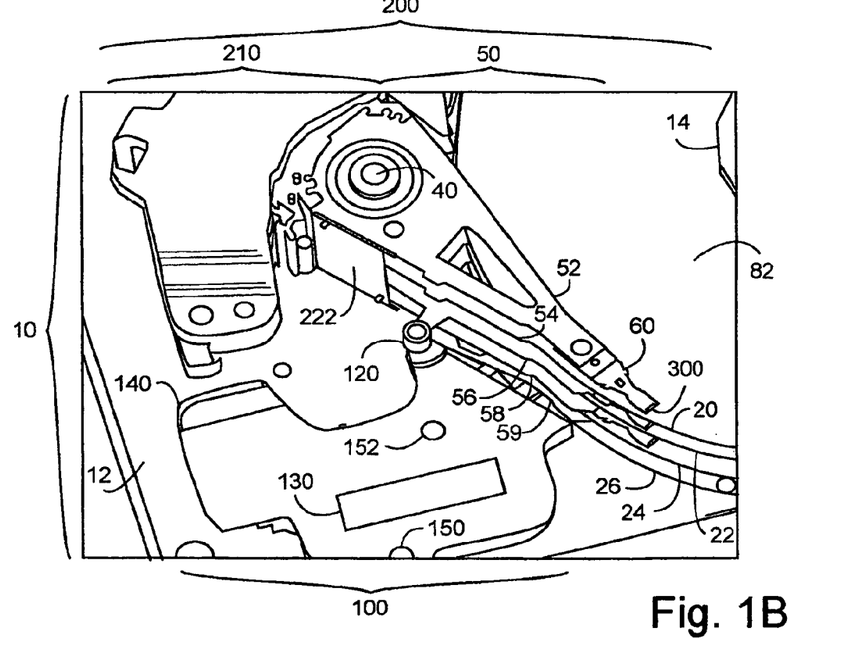
FIG. 1B shows the hard disk drive including an actuator assembly with an alternative flexible printed circuit bracket containing a crash stop stub.

The flexible printed circuit bracket 100 is shown with just the crash stop rubber 120 in FIG. 1B. The crash stop rubber stops the actuator assembly 200 from destructively swinging away from the disk 20, by contacting a crash stop stub 70 on the actuator arm block 50. Such embodiments including the crash stop rubber reduce the parts count in the assembled hard disk drive 10.

Figure 2A:
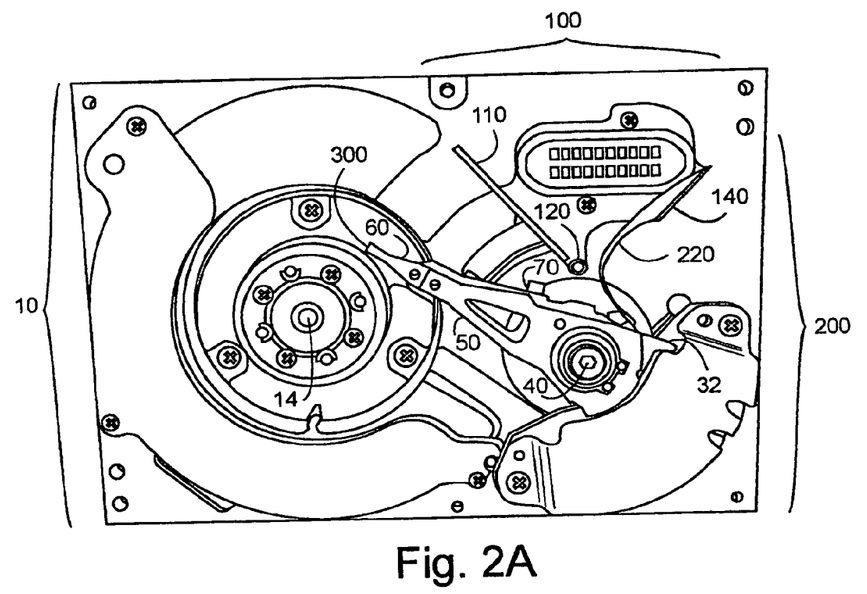
FIGS. 2A and 2B show embodiments of the hard disk drive with alternative embodiments of the flexible printed circuit bracket including both an air block and a crash stop stub.
Figure 2B:
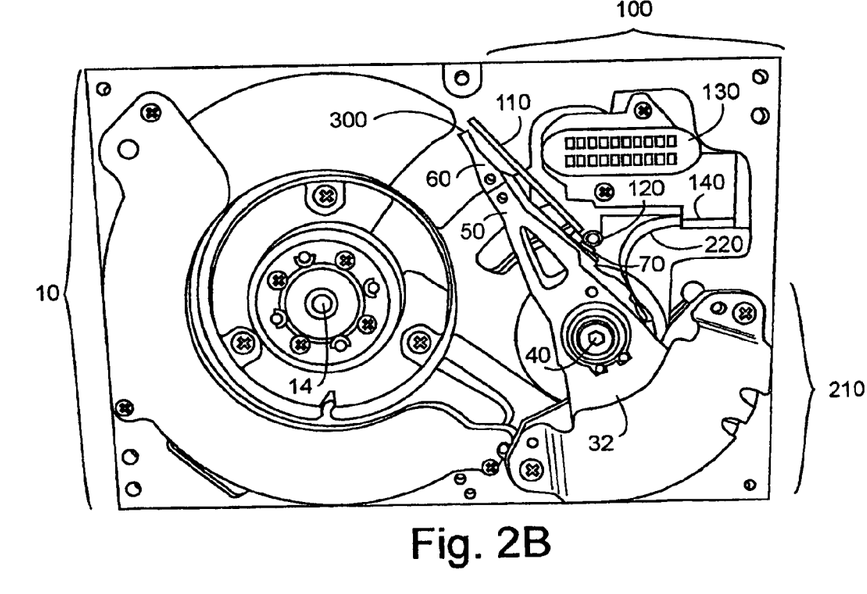
Figure 3A:
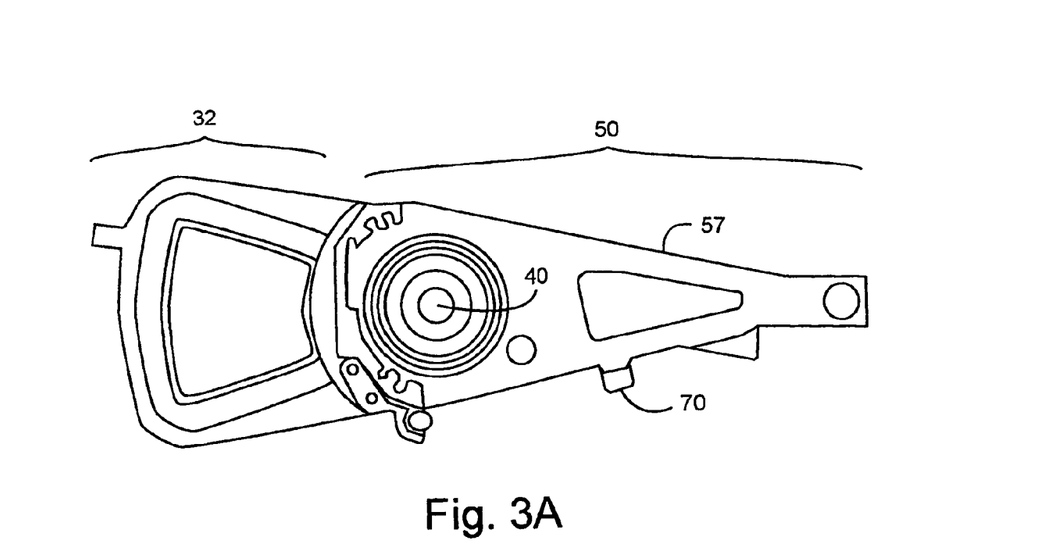
FIGS. 3A and 3B show the actuator arm block coupled with the voice coil.
Figure 3B:
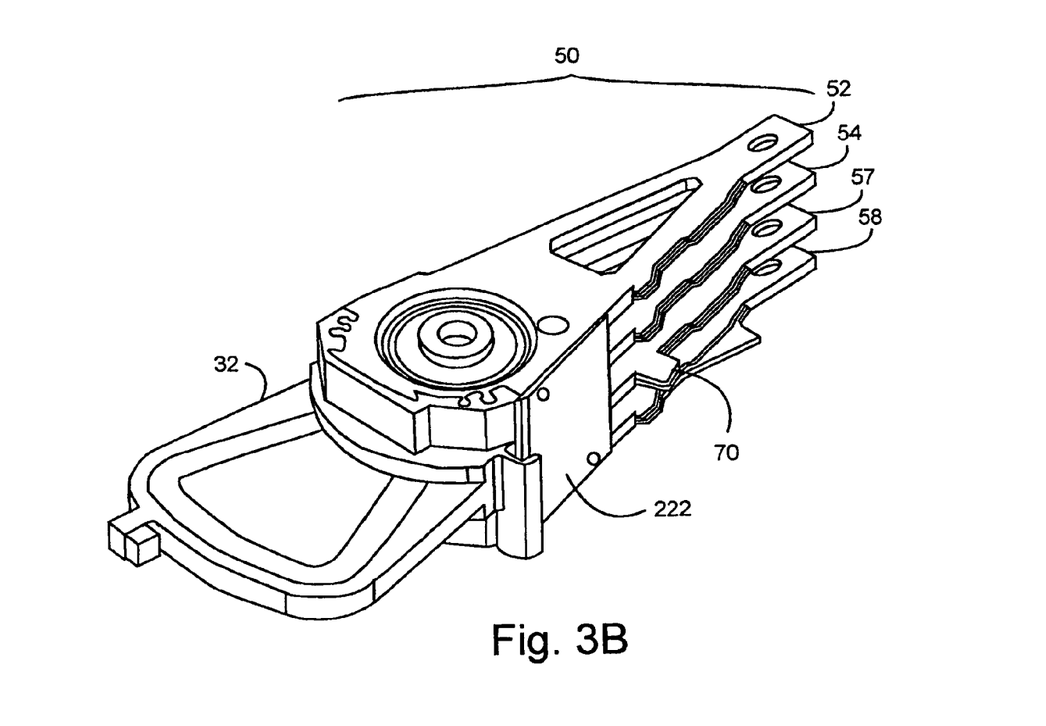
Figure 4A:
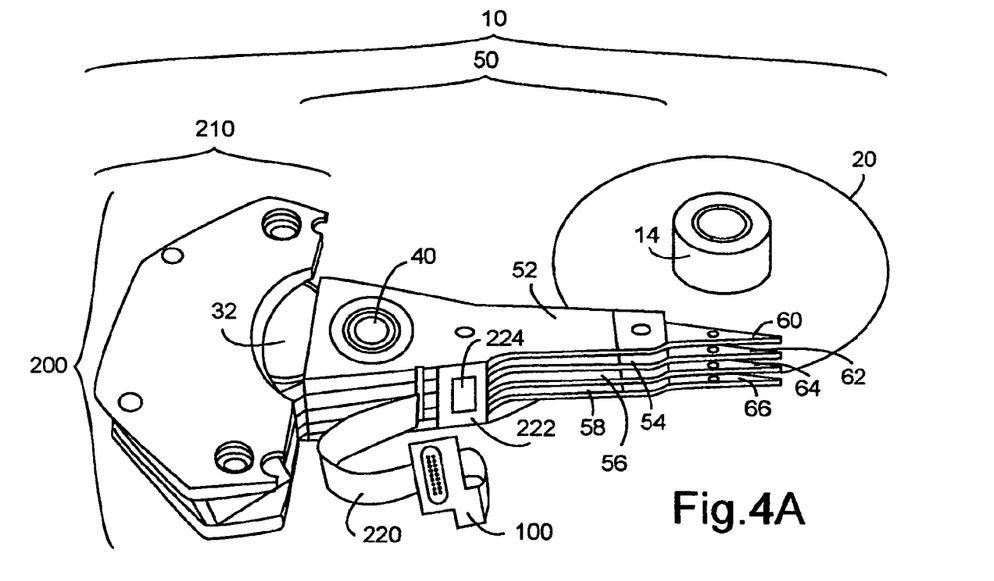
FIG. 4A shows the actuator assembly including the voice coil motor, the actuator arm block coupled to the flexible printed circuit, that couples to the flexible printed circuit bracket for inclusion in the hard disk drive.
Figure 4B:
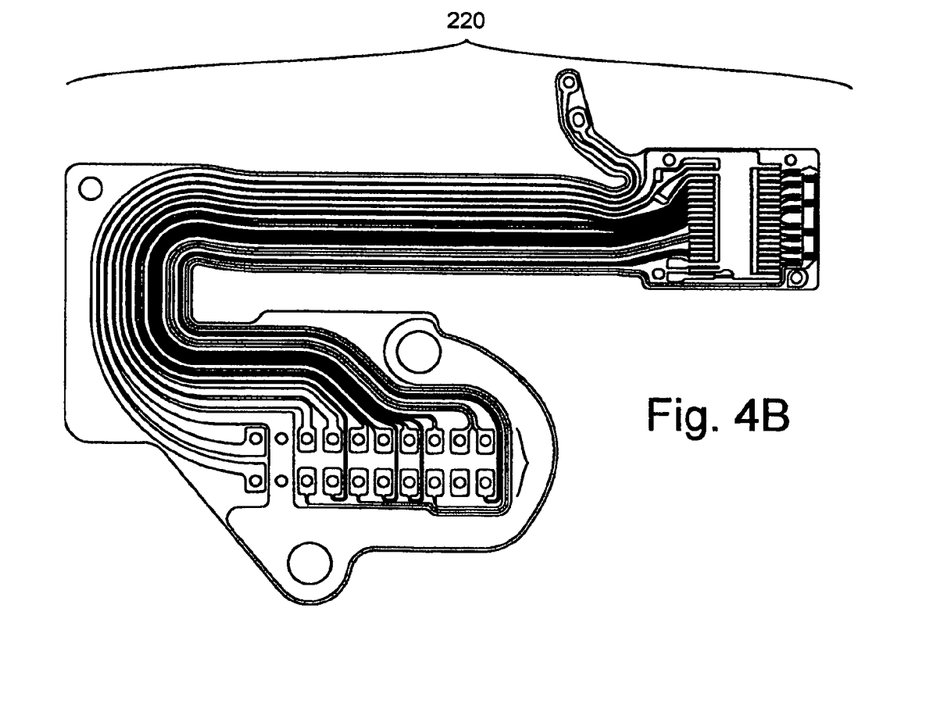
FIG. 4B shows an embodiment of the flexible printed circuit.

The preferred flexible printed circuit bracket 100 is shown with both the crash stop rubber 120 and an embodiment of the air block 110 in FIGS. 2A and 2B. The crash stop rubber is situated on the windward side of the air block, further forming an airfoil that further directs the airflow away from the head gimbal assembly 60, when used in the hard disk drive 10. As previously stated Embodiments including both the crash stop rubber and the air block reduce both the parts count and the air flow at the read-write head 300.

The various embodiments of the flexible printed circuit bracket 100 shown in FIGS. 1A to 2B typically include a ribbon cable connector site 130, a flex mounting interface 140 and at least one means for attaching 150 the flexible printed circuit bracket to a disk base 12. It is often preferred that the means for attaching be a screw hole aligned to a threaded screw hole in the disk base. The flexible printed circuit bracket may preferably include a second means for attaching 152 the flexible printed circuit bracket to the disk base. The flex mounting interface often faces the actuator assembly 200 near the voice coil motor 210. Preferably, the crash stop rubber 120 and/or the air block 110 are rigidly aligned to the ribbon cable connector site and to the flex mounting interface. In certain embodiments, the ribbon cable connector site may directly couple to an embedded control printed circuit board without the use of an intervening ribbon cable.

Making the actuator assembly 200 may include the following steps: mounting the flexible printed circuit bracket 100 and the flexible printed circuit 220, and coupling the flexible printed circuit to an actuator arm block 50. The actuator arm block preferably includes the crash stop stub 70.

The hard disk drive 10 of the invention may include the following from FIGS. 1A to 4B: A flexible printed circuit 220 electrically and mechanically couples with the flexible printed circuit bracket 100, in particular, with the ribbon cable connector site 130. The flexible printed circuit is electrically and mechanically coupled with a preamplifier site 222 on the actuator arm block 50. The actuator arm block includes a crash stop stub 70 in a middle actuator arm 56, aligned to contact the crash stop rubber 120 when the actuator assembly 200 swings away from the disk spindle 14.

Referring further to the operation of the hard disk drive 10, the actuator assembly 200 swings about the actuator axis 40. During normal access operations, the actuator assembly pivots through the actuator axis by the interaction between the voice coil 32 coupled to the actuator arm block 50 and the fixed magnets of the voice coil motor 210. A disk controller drives at least one electrical signal provided to the voice coil. As the electrical signal varies over time, the actuator assembly moves, varying the position of the read-write head 300, that is located in at least one head gimbal assembly 60 attached to an actuator arm 52 of the actuator arm block.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A hard disk drive, comprising:
   a disk base;
   a flexible printed circuit bracket, comprising a crash stop rubber and an air block, both rigidly aligned to a ribbon cable connector site, and to a flex mounting interface, and at least one means for attaching to a disk base rigidly, with
   said flexible printed circuit bracket coupled to a flexible printed circuit, said flexible printed circuit further coupling to an actuator arm block in an actuator assembly and rigidly mounted to said disk base;
   said air block forms an airfoil for directing an airflow away from a head gimbal assembly attached to said actuator assembly to minimize positional variance of a read-write head included said head gimbal assembly; and
   said crash stop rubber is aligned for coupling to a crash stop stub on said actuator assembly to stop said actuator assembly from swinging away from a rotating disk surface;
   wherein said airflow is induced by a rotating disk surface near said head gimbal assembly.

2. The hard disk drive of claim 1, wherein said air block forms an airfoil for directing an airflow away from a head gimbal assembly attached to an actuator assembly in said hard disk drive to minimize positional variance of a read-write head included said head gimbal assembly;
   wherein said airflow is induced by a rotating disk surface near said head gimbal assembly.

3. The hard disk drive of claim 1, wherein said crash stop rubber is aligned for coupling to a crash stop stub on an actuator assembly in said hard disk drive to stop said actuator assembly from swinging away from a rotating disk surface in said hard disk drive.

4. The hard disk drive of claim 3, wherein said crash stop stub is part of a middle actuator arm in an actuator arm block within said actuator assembly.

5. The hard disk drive of claim 1, wherein said actuator assembly comprises:

said flexible printed circuit bracket coupled to a flexible printed circuit; and said flexible printed circuit coupled to an actuator block.

6. The hard disk drive of claim 1, wherein said flexible printed circuit bracket, comprises:

said crash stop rubber rigidly aligned to said ribbon cable connector site and to said flex mounting interface, and aligned for coupling to a crash stop stub on said actuator assembly in said hard disk drive to stop said actuator assembly from swinging away from a rotating disk surface in said hard disk.

7. The hard disk drive of claim 6, wherein said crash stop stub is part of a middle actuator arm in an actuator arm block within said actuator assembly.

8. The hard disk drive of claim 6, further comprising an air block rigidly aligned to a ribbon cable connector site and to a flex mounting interface.

9. The hard disk drive of claim 8, wherein said air block forms an airfoil for directing an airflow away from a head gimbal assembly attached to an actuator assembly in said hard disk drive to minimize positional variation of a read-write head included said head gimbal assembly;

wherein said airflow is induced by a rotating disk surface near said head gimbal assembly.

10. A method of making a hard disk drive, comprising the steps of:

using an actuator assembly produced by a method of making said actuator assembly comprising the steps of coupling a flexible printed circuit bracket to a flexible printed circuit board, with said flexible printed circuit bracket, comprising: an air block rigidly aligned to a ribbon cable connector site, to a flex mounting interface, and at least one means for attaching to a disk base rigidly, with said air block configured to form an airfoil for directing an airflow away from a head gimbal assembly attached to an actuator assembly in said hard disk drive to minimize positional variance of a read-write head included said head gimbal assembly, and with said airflow is induced by a rotating disk surface near said head gimbal assembly; and coupling said flexible printed circuit to an actuator block to create said actuator block;

aligning said crash stop rubber for coupling to a crash stop stub on said actuator assembly to stop said actuator assembly from swinging away from a rotating disk surface; and attaching said means for attaching to said disk base to rigidly mount said air block to said disk base.

11. The hard disk drive as a product of the process of claim 10.

12. The hard disk drive of claim 11, further comprising:

a crash stop rubber rigidly aligned to said ribbon cable connector site and to said flex mounting interface, and aligned for coupling to a crash stop stub on an actuator assembly in said hard disk drive to stop said actuator assembly from swinging away from a rotating disk surface in said hard disk drive.

\* \* \* \* \*

UNITED STATES PATENT AND TRADEMARK OFFICE
CERTIFICATE OF CORRECTION

| | | |
|---|---|---|
| PATENT NO. | : 7,706,107 B2 | Page 1 of 1 |
| APPLICATION NO. | : 11/028354 | |
| DATED | : April 27, 2010 | |
| INVENTOR(S) | : Gregory Tran et al. | |

It is certified that error appears in the above-identified patent and that said Letters Patent is hereby corrected as shown below:

Title Page, Assignee: Item [73]
Please change "PACECO Corp., Hayward, CA (US)" to "Samsung Electronics Co., LTD., Suwon (KR)"

Signed and Sealed this
Seventeenth Day of May, 2011

David J. Kappos
*Director of the United States Patent and Trademark Office*